July 27, 1943.  J. DE SWART  2,325,309
PROCESS OF CAPPING BOTTLES
Filed Dec. 4, 1942
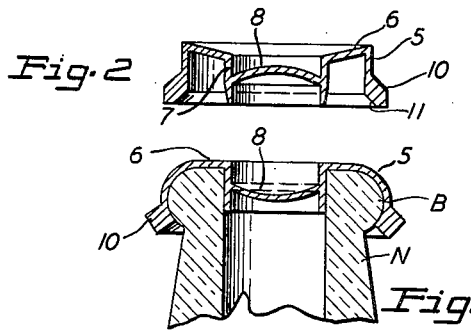
Fig. 2
Fig. 3
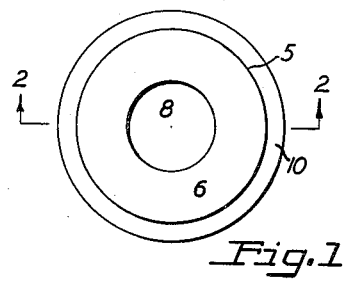
Fig. 1
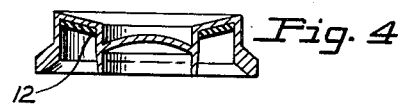
Fig. 4
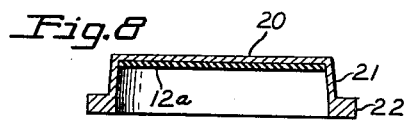
Fig. 8
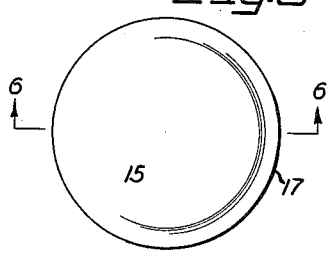
Fig. 5
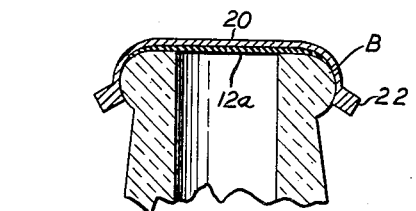
Fig. 9
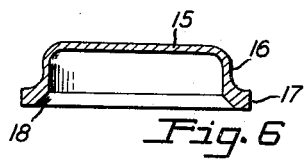
Fig. 6
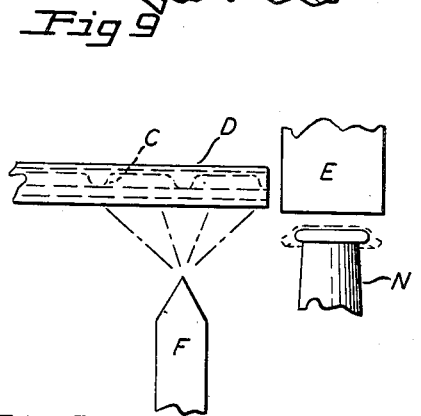
Fig. 10
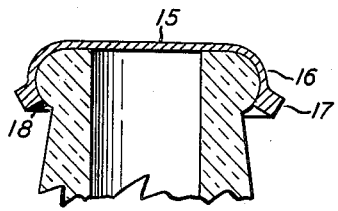
Fig. 7
Inventor
Jan de Swart
By
Atty.

Patented July 27, 1943

2,325,309

UNITED STATES PATENT OFFICE 2,325,309

PROCESS OF CAPPING BOTTLES

Jan de Swart, Los Angeles, Calif., assignor of one-half to C. Bland Jamison, Beverly Hills, Calif.

Application December 4, 1942, Serial No. 467,866

2 Claims. (Cl. 226—80)

This invention has to do with sealing caps for bottles and the like, as well as bottle sealing methods, and is a continuation in part of my copending application Serial Number 456,885, filed September 1, 1942, which application has now become technically abandoned in favor of this application.

In its more particular aspects, my invention contemplates a hard and substantially non-flexible plastic cap which is so constructed, of a plastic capable of being rendered temporarily pliable and remolded, as to be applied in sealing relationship to a bottle without injury to the cap and which not only is capable of sealing the bottle against substantial pressures but which also compensates for the cold flow characteristics prevalent in most plastics.

I am aware that attempts have been made to produce a successful thermoplastic bottle cap but so far as I am aware, no such cap has been produced which is capable of general use to cap bottles containing fluids such as carbonated beverages, beer or the like. Such prior caps have been incapable of maintaining an effective seal where substantial pressures are generated in the bottle; and have been incapable of withstanding the temperatures incident to pasteurization processes. For instance, pasteurization processes commonly utilize temperatures of the order of 160° or more and thermoplastic caps heretofore produced do not maintain a seal under such conditions. Another shortcoming of prior caps has been the fact that they fail to maintain an effective seal after the plastics of which the caps are made have undergone the normal cold flow.

It is among the aims of my invention to overcome those shortcomings and, generally speaking, I accomplish this by providing a cap preformed of a cold-setting plastic capable of being rendered temporarily pliable and then reformed and rehardened about the neck of a bottle. An important characteristic of my improved cap resides in the fact that its side wall presents a peripheral bead of relatively thick cross-section and having a relatively low setting rate which, after being temporarily softened, is remolded to the contour of the external marginal bead forming a part of the conventional beer or carbonated beverage bottle. This bead portion undergoes relatively delayed hardening and constriction about the curved neck bead of the bottle and effectively draws the remaining portions of the cap into sealing relationship with the neck.

Another object and feature of my invention is the provision of a plastic cap having a construction which provides a double seal.

Another object is the provision of a cap having a guiding formation to guide it onto a bottle during capping.

Certain rather critical relationships as regards size and proportion of parts in relation to the proportions of the bottle to be capped are also among the objects of my invention and a still further object is the provision of a novel capping method.

Still further advantages are derived from my invention and how I achieve those advantages as well as the objects and advantages hereinabove specifically enumerated will be best understood from the following explanation of presently preferred examples of caps embodying the invention, for which purpose I shall refer to the accompanying drawing, in which:

Fig. 1 is a top plan view of one embodiment;

Fig. 2 is a cross-sectional view taken on line 2—2 of Fig. 1 showing the cap in its initial or preformed shape;

Fig. 3 is a section similar to Fig. 2 except that it shows the cap reformed about a bottle neck;

Fig. 4 is a section similar to Fig. 2 but showing a resilient lining member for the top wall of the cap;

Fig. 5 is a top plan view of another form of cap embodying my invention;

Fig. 6 is a section on line 6—6 of Fig. 5, showing the cap in its initial or preformed shape;

Fig. 7 is a section similar to Fig. 6 except that it shows the cap reformed about the bottle neck;

Fig. 8 is a cross-sectional view of another preferred form of cap in its initial or preformed condition;

Fig. 9 is a section similar to Fig. 8 but showing the cap reformed about a bottle neck; and Fig. 10 is a side view illustrating an assembly line suitable for carrying out my method.

In Figs. 1 to 4, inclusive, I show a cap having a cylindric side wall 5 and an end wall 6 formed, as by molding, of a thermoplastic cold-setting material capable of being softened, as by the application of heat. While any one of a large number of well known thermoplastic materials is suitable, I have found the cellulose acetate and butyrate plastics to be well suited for the purpose. Among others, I have also found a plastic consisting of an asphalt base having a fibrous filler to be suitable. Concentric with side wall 5 and spaced therefrom by the end wall 6, there is an inner cylindric wall 7 adapted to have sealing engagement with the inner surface of the neck N of a conventional bottle. At a point between and spaced from the ends of wall 7, I provide an upwardly vaulted, circular partition wall 8 for the purpose to be described. At and adjacent its bottom edge, wall 7 is exteriorly beveled to guide cylindric wall 7 into the neck opening during capping. Side wall 5 presents a peripheral bead 10 which is of relatively thick cross-section whereby to have a relatively lower cooling or setting rate than adjacent portions of the cap and also to have greater constricting strength. Bead 10 has an interior bevel 11 at its bottom edge to guide the cap onto the bottle neck. End wall 6 is disposed at an acute angle to side wall 5, which facilitates proper reforming of the cap on the bottle neck after the cap is softened, and also enables the wall 7 to be of minimum length and yet project inwardly a sufficient distance to facilitate proper centering of the cap in the capping operation.

The cap is initially formed and hardened into the shape shown in Fig. 2, with the interior diameter of the side wall 5 being substantially equal to the exterior diameter of the bottle neck immediately under the marginal bead B of the neck, and the exterior diameter of circular wall 7 is substantially equal to or may be slightly greater than the interior diameter of the bottle neck. After being thus preformed, the cap is relatively non-resilient, so that in order to be applied to a bottle it must undergo further treatment, as will now be described.

To apply the preformed cap to the bottle, the cap is rendered temporarily pliable by application of heat and while in that state a capping device is used to force the cap over the neck and to constrict the peripheral bead 10 about the curved lower half of the marginal bead B of the bottle neck. The width, or depth, of the side wall 5—that is, the distance between its point of intersection with the top wall and the bottom of the bead 10—is more than half but less than the entire width of the outwardly curved marginal bead B of the bottle, so that as the bead B rehardens after being so softened and applied, it is not only securely anchored against longitudinal escape but also as it undergoes its relatively delayed hardening or cooling exclusively about the lower portion of bead B below its point of maximum diameter and out of contact with the neck below the bead—delayed with respect to the relatively more rapid hardening of the cap portions of thinner cross-section—it tends to further constrict about the bead B after the adjacent portions of the cap have set, following the curvature of said bead. This constricting action is not halted by contact of the bead 10 with the exterior surface of the bottle neck immediately beneath the neck bead B due to the relative width of the neck bead and the cap side wall.

In thus forcing the cap onto the bottle neck, I utilize a capping device which presents a central plunger projecting into the circular space provided by wall 7 to press partition wall 8 into reversely vaulted condition (Fig. 3), or into flattened position as shown by dotted lines in Fig. 3, thus forcing the wall 7 radially against the inner surface of the bottle neck.

After being thus reformed about the bottle neck and rehardened, the cap effectively seals the bottle against even very substantial pressures or vacuums. In fact, by actual test, I find my cap to effectively seal bottles containing pressures of the order of 200 pounds p. s. i. even in the presence of pasteurization temperatures. Peripheral bead 10 serves an extremely important function in bringing about this result because of its relative section and its relatively delayed cooling characteristics and because it so stretches the cap over the bottle as to compensate for the usual cold flow which takes place in plastics after being molded. I may further compensate for such cold flow by lining the top wall 6 with a relatively resilient material 12 (Fig. 4) such for instance as cork or a plastic composition suitable for the purpose.

In Fig. 10 I show, somewhat diagrammatically, an assembly suitable for carrying out my capping method. Here the caps C are caused to move along a chute D to be discharged onto a bottle under a capper E. As the caps approach the discharge end of the chute they are subjected to a softening temperature by heat applying member F which may be a steam jet, an infra red lamp or other suitable means.

In Figs. 5 to 7, inclusive, I show another specific form of cap embodying my invention. Here the cap is likewise formed of a thermoplastic material capable of being rendered temporarily pliable and remolded about the bottle neck, the cap consisting of a top wall 15 and a side wall 16 having an interior diameter substantially equal to the outside diameter of the bottle neck N immediately below the exterior marginal neck bead B and having a width more than half but less than the entire width of the outwardly curved neck bead B. Side wall 16 has a peripheral bead 17 of relatively thick cross-section presenting an interior bevel 18 at and adjacent its bottom edge to guide the cap onto the bottle neck. This cap is applied in the same manner as the cap previously described except that it has no projection insertable in the neck opening.

In Figs. 8 and 9 I show still another specific embodiment of my invention which is also preformed of a thermoplastic material capable of being softened and remolded about the bottle neck. Here the cap consists of a flat top wall 20 and a circular side wall 21 presenting a peripheral bead 22 of relatively thick cross-section. A resilient lining member 12a is provided for the top wall 20 in the manner before described, which lining member may be of cork or other suitably resilient material. In this form of cap, by utilizing the resilient liner 12a, I am able to make the interior diameter of the cap great enough to permit the cap to be relatively easily mounted over the marginal bead B of the bottle after being rendered temporarily pliable. By using a capping device to constrict the peripheral bead 22 inwardly about the lower half of the neck bead B after the cap has been rendered temporarily pliable, and allowing the cap to harden in that position, an extremely secure seal is provided. Here the side wall 21 slightly flares outwardly at an angle to top wall 20.

Obviously caps embodying the broad concept of this invention, as defined by the claims, may be made to present physical characteristics differing from those here shown and described and therefore it is not my desire to limit the invention to those particular details of construction excepting only insofar as they may be specifically incorporated in the appended claims.

I claim:

1. The method of applying a plastic cap having an end wall and a marginally beaded skirt to a bottle neck having a marginal flange of semicircular cross-section, which includes the steps of applying the cap in conforming relation about the neck while the cap is in a softened condition, first placing the end wall under initial tension by hardening it and the adjacent skirt portion, and then placing the end wall under additional tension by finally hardening the marginal skirt portion exclusively about the lower portion of the neck flange below its point of maximum diameter and out of contact with the neck below the flange after the end wall and said adjacent skirt portion have hardened.

2. The method of applying a thermoplastic cap having an end wall and a skirt whose marginal portion is of relatively thick section to a bottle neck having a marginal flange of semi-circular cross-section, which includes the steps of temporarily softening the cap, applying it in conforming engagement with the neck with a resilient liner interposed between the end wall and the end of the neck, first placing the liner under initial compression by hardening the end wall and adjacent skirt portion, and then placing the liner under final compression by hardening the marginal skirt portion exclusively about the lower portion of the neck flange below its point of maximum diameter and out of contact with the neck below the flange after the end wall and said adjacent skirt portion have hardened.

JAN DE SWART.